United States Patent
Sip et al.

(10) Patent No.: US 8,253,650 B2
(45) Date of Patent: Aug. 28, 2012

(54) ELECTRONIC DEVICE WITH EXTENSIBLE SCREEN

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 517 days.

(21) Appl. No.: 12/507,082

(22) Filed: Jul. 22, 2009

(65) Prior Publication Data
US 2010/0259463 A1   Oct. 14, 2010

(30) Foreign Application Priority Data
Apr. 10, 2009 (CN) .......................... 2009 1 0301470

(51) Int. Cl.
*G09G 5/00* (2006.01)

(52) U.S. Cl. ........... 345/1.3; 345/1.1; 345/1.2; 345/169; 345/173; 361/679.02; 361/679.04; 455/575.4

(58) Field of Classification Search ............ 345/1.1–1.3, 345/169, 173; 361/679.02, 679.21, 679.26, 361/679.04; 455/566, 575.4
See application file for complete search history.

(56) References Cited

U.S. PATENT DOCUMENTS

| | | | |
|---|---|---|---|
| 6,643,124 B1 * | 11/2003 | Wilk ......................... | 361/679.04 |
| 7,092,247 B2 * | 8/2006 | Kim ......................... | 361/679.04 |
| 7,138,962 B2 * | 11/2006 | Koenig .......................... | 345/1.3 |
| 7,196,676 B2 * | 3/2007 | Nakamura et al. ............. | 345/1.1 |
| 7,353,053 B2 * | 4/2008 | Prichard et al. ............ | 455/575.4 |
| 7,496,378 B2 * | 2/2009 | Kawamura ................. | 455/556.1 |
| 7,808,549 B2 * | 10/2010 | Kanai et al. ................... | 348/373 |
| 2005/0248501 A1 * | 11/2005 | Kim ............................. | 345/1.1 |
| 2009/0102744 A1 * | 4/2009 | Ram .............................. | 345/1.1 |
| 2009/0233660 A1 * | 9/2009 | Demuynck ................ | 455/575.4 |
| 2010/0039350 A1 * | 2/2010 | Wakefield et al. ............. | 345/1.3 |
| 2010/0060547 A1 * | 3/2010 | Bloebaum et al. ............ | 345/1.3 |
| 2010/0159993 A1 * | 6/2010 | Davidson et al. ............. | 455/566 |
| 2010/0311479 A1 * | 12/2010 | Sip et al. .................... | 455/575.4 |

* cited by examiner

*Primary Examiner* — Lun-Yi Lao
*Assistant Examiner* — Priyank Shah
(74) *Attorney, Agent, or Firm* — Altis Law Group, Inc.

(57) ABSTRACT

An electronic device includes a first display, a second display, numerous of first and second guide rail members, a movable unit, and a driver unit. The first guide rail members are configured for guiding the first display to move between a first position and a second position, and the second guide rail members are configured for guiding the second display to move between a third position and a fourth position. The driver unit is configured for driving the movable unit to move the second display between the fourth position and a fifth position along a direction perpendicular to the sliding direction of the second display. When the first display is in the second position and the second display is in the fifth position, the first display and the second display are coplanar.

15 Claims, 10 Drawing Sheets

ELECTRONIC DEVICE WITH EXTENSIBLE SCREEN

BACKGROUND

1. Technical Field

The present disclosure relates to an electronic device with an extensible screen.

2. Description of Related Art

There is a growing demand for big screens for displaying text and/or graphics for use in personal computers and other portable electronic devices. However, this demand may challenge miniaturization of these devices.

Therefore, what is needed is to provide an electronic device with an extensible screen, in which the above problems are eliminated or at least alleviated.

DETAILED DESCRIPTION

Figure 1:
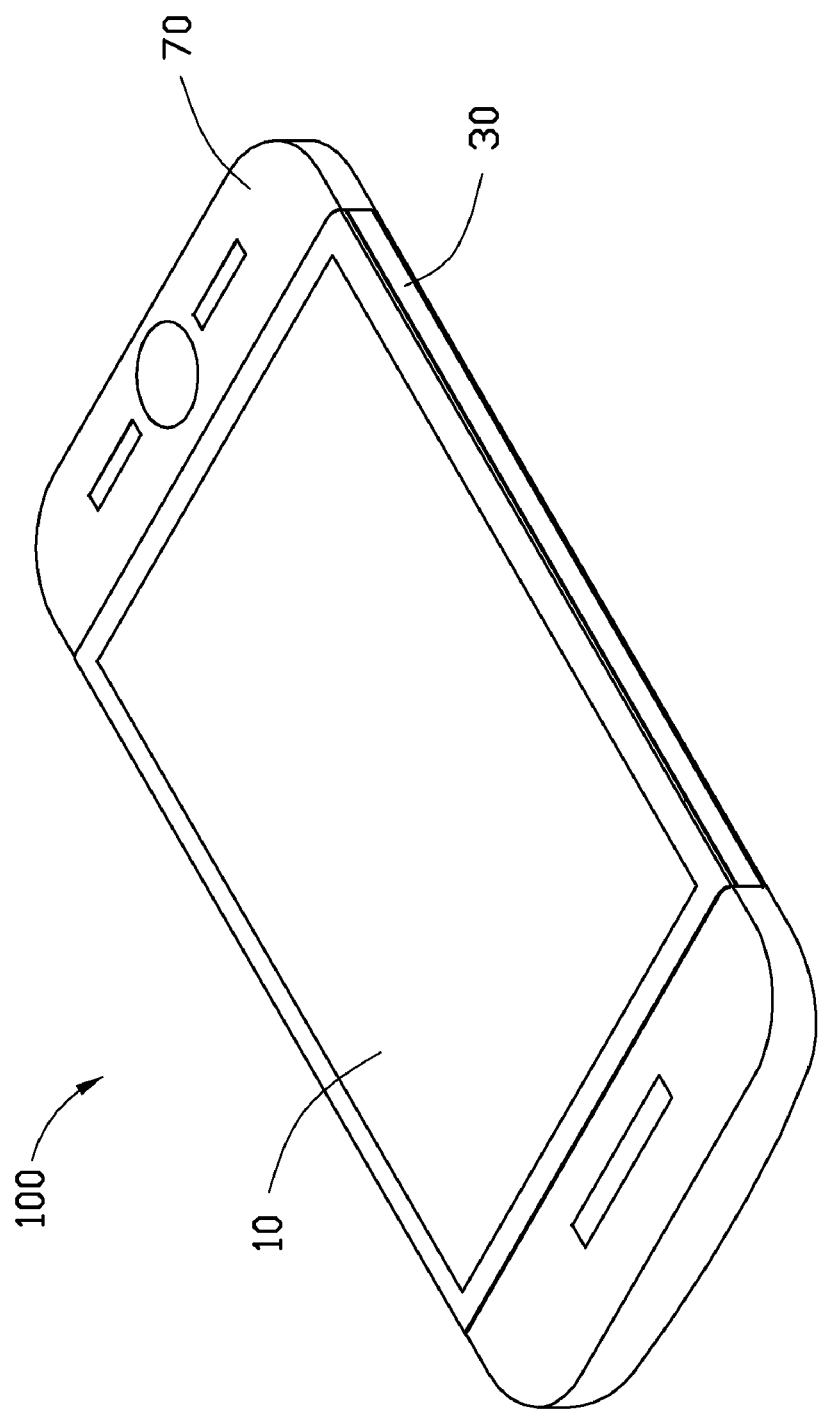
FIG. 1 is an isometric view of an electronic device, according to an exemplary embodiment.
Figure 2:
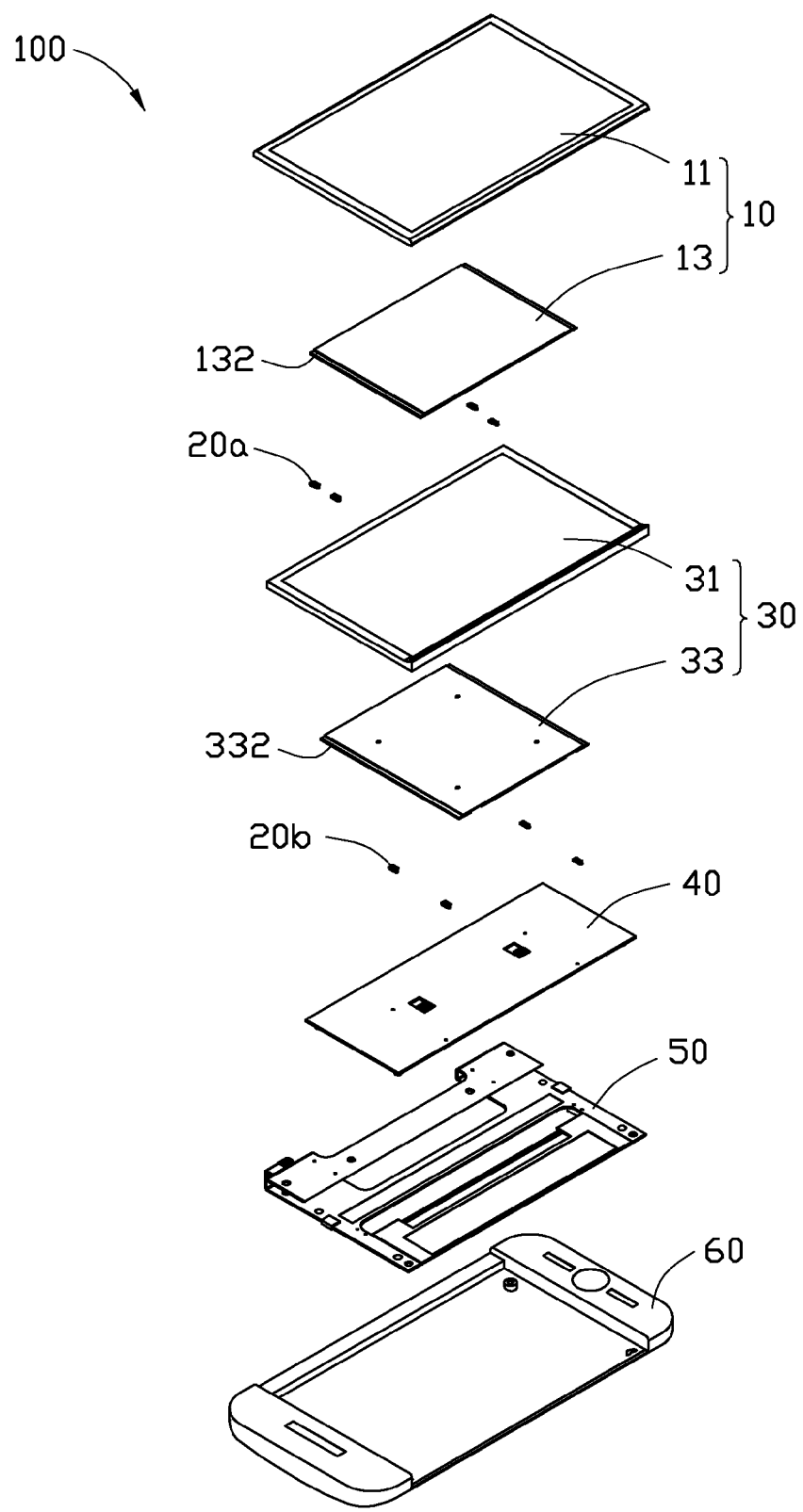
FIG. 2 is an exploded view of the electronic device of FIG. 1, including a guide rail member, a driver unit and a movable unit.
Figure 3:
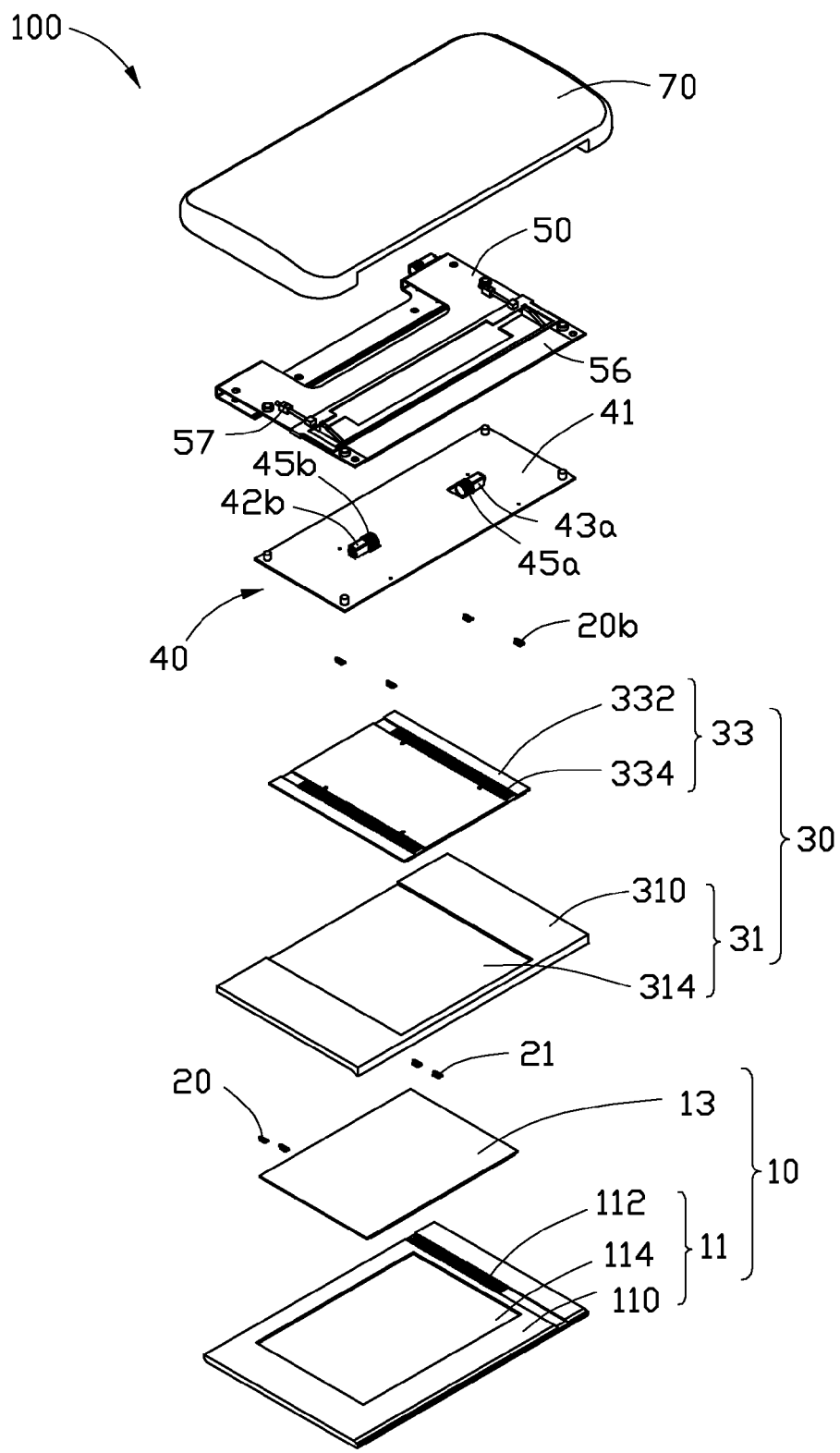
FIG. 3 is similar to FIG. 2, but viewing the electronic device from another angle.
Figure 4:
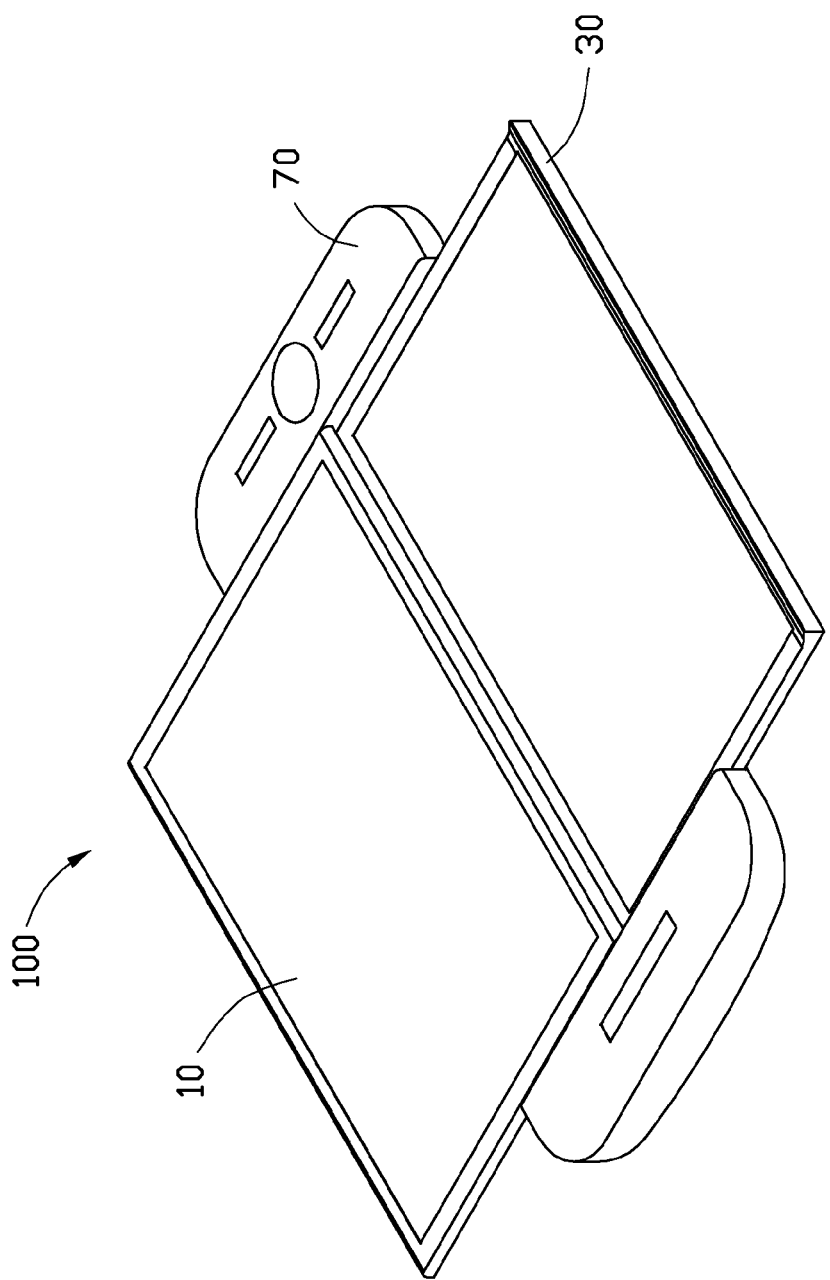
FIG. 4 is an isometric view of the electronic device of FIG. 1 in a first state.

Referring to FIGS. 1, 2 and 3, an electronic device 100 according to an exemplary embodiment, includes a first display 10, a first group guide rail members 20a and a second group guide rail members 20b, a second display 30, a movable unit 40, a driver unit 50 and a housing 60. The first display 10, the first and the second group guide rail members 20a, 20b, the second display 30, the movable unit 40 and the driver unit 50 are accommodated in the housing 60. The first group guide rail members 20a are fixed to the driver unit 50 to guide the first display 10 to slide between a first position (see FIG. 1) and a second position (see FIG. 4). The second group guide rail members 20b are fixed to the movable unit 40 to guide the second display 30 to slide between a third position (see FIG. 1) and a fourth position (see FIG. 4).

The movable unit 40 is movable mounted on the driver unit 50, and is driven by the driver unit 50 to move the second display 30 between the fourth position (see FIG. 4) and a fifth position (see FIG. 5) along a direction perpendicular to the sliding direction of the second display 30. When the first display 10 is in the first position and the second display 30 is in the third position, the first display 10 covers the second display 30 (see FIG. 1). The first display 10 can be active and the second display 30 may be on a standby state or shut down. When the first display 10 is in the second position and the second display 30 is in the fourth position, an orthogonal projection of the first display 10 is next to that of the second display 30 (see FIG. 4). When the first display 10 is in the second position and the second display 30 is in the fifth position, the first display 10 and the second display 30 are coplanar (see FIG. 5) to cooperatively display information.

The first display 10 includes a first screen 11 to display information and a first slidable portion 13 fixed to the first screen 11. In the illustration of FIG. 2 and FIG. 3, the first slidable portion 13 is shown as being apart from the first display screen 11 because FIGS. 2 and 3 are exploded views of the electronic device 100 or parts thereof. The first screen 11 includes a first body 110 (see FIG. 3), a first elongated teethed portion 112 fixed on the first body 110, and a first recess 114 defined on the first body 110. The first elongated teethed portion 112 extends along the sliding direction of the first display 10. The first slidable portion 13 is non-moveably received in the first recess 114 by an adhesive or a bolt and extends along the sliding direction of the first display 10. The first slidable portion 13 includes two opposite first slidable bars 132 (see FIG. 2) extending along the sliding direction of the first display 10. Each first slidable bar 132 is parallel to the first elongated teethed portion 112.

Figure 6:
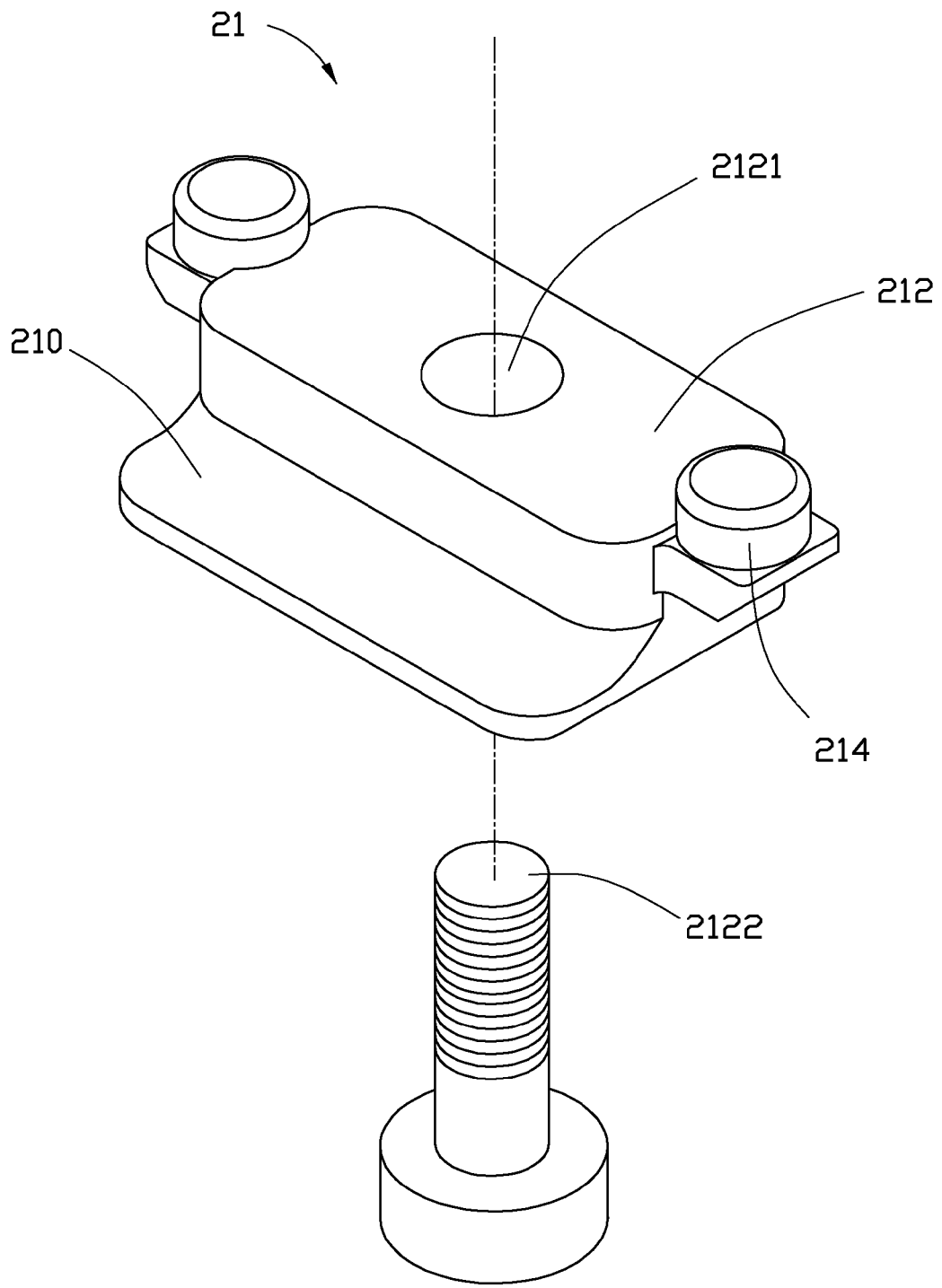
FIG. 6 is an isometric view of the guide rail member of the electronic device of FIG. 2.

Further referring to FIG. 6, the first group guide rail members 20a and the second group guide rail members 20b both have the same structure including four guide rail members 21. Each guide rail member 21 includes a guiding recess 210, a body 212 and two feet 214. The guiding recess 210 is defined on the body 212. The two feet 214 are symmetrically distributed on the body 212 to steady the body 212. The guiding recesses 210 of the first group guide rail members 20a are defined to receive the two first slidable bars 132 of the first slidable portion 13. When the first display 10 is pushed along the sliding direction of the first display 10, the first slidable portion 13 together with the first display 10 can slide along the first group guide rail members 20a between the first position and the second position. A threaded hole 2121 is defined through the body 212 to receive a bolt 2122. The guide rail member 21 is fixed by the threaded hole 2121 together with the bolt 2122. In other embodiments, the feet 214 can be omitted.

As shown in FIG. 3, the second display 30 includes a second screen 31 to display information and a second slidable portion 33 fixed on the second screen 31. The second screen 31 includes a second body 310 and a second recess 314 set on the second body 310. The second slidable portion 33 is non-moveably received in the second recess 314 by an adhesive or a bolt and extends along the sliding direction of the second display 30. The second slidable portion 33 includes two opposite second slidable bars 332 and two opposite second elongated teethed portions 334. Both the second slidable bars 332 and the second elongated teethed portions 334 extend along the sliding direction of the second display 30. Each second slidable bar 332 is parallel to each second elongated teethed portion 334.

The guiding recesses 210 of the second group guide rail members 20b receive the two second slidable bars 332 of the second slidable portion 33. When the second display 30 is pushed along the sliding direction of the second display 30, the second slidable portion 33 together with the second display 30 can slide along the second group guide rail members 20b between the third position and the fourth position, via the two second slidable bars 332.

Figure 7:
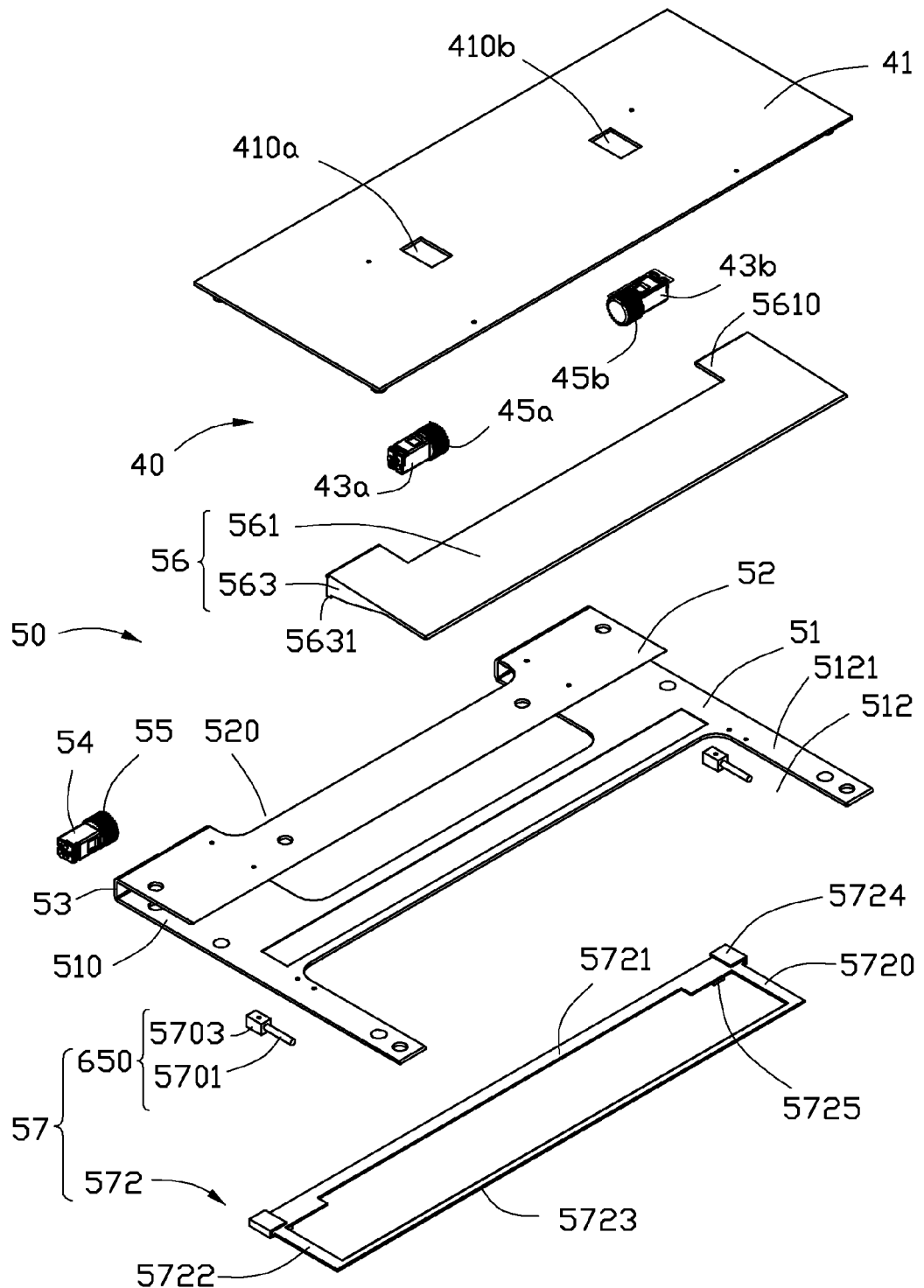
FIG. 7 is an exploded view of the driver unit and the movable unit of the electronic device of FIG. 2.
Figure 8:
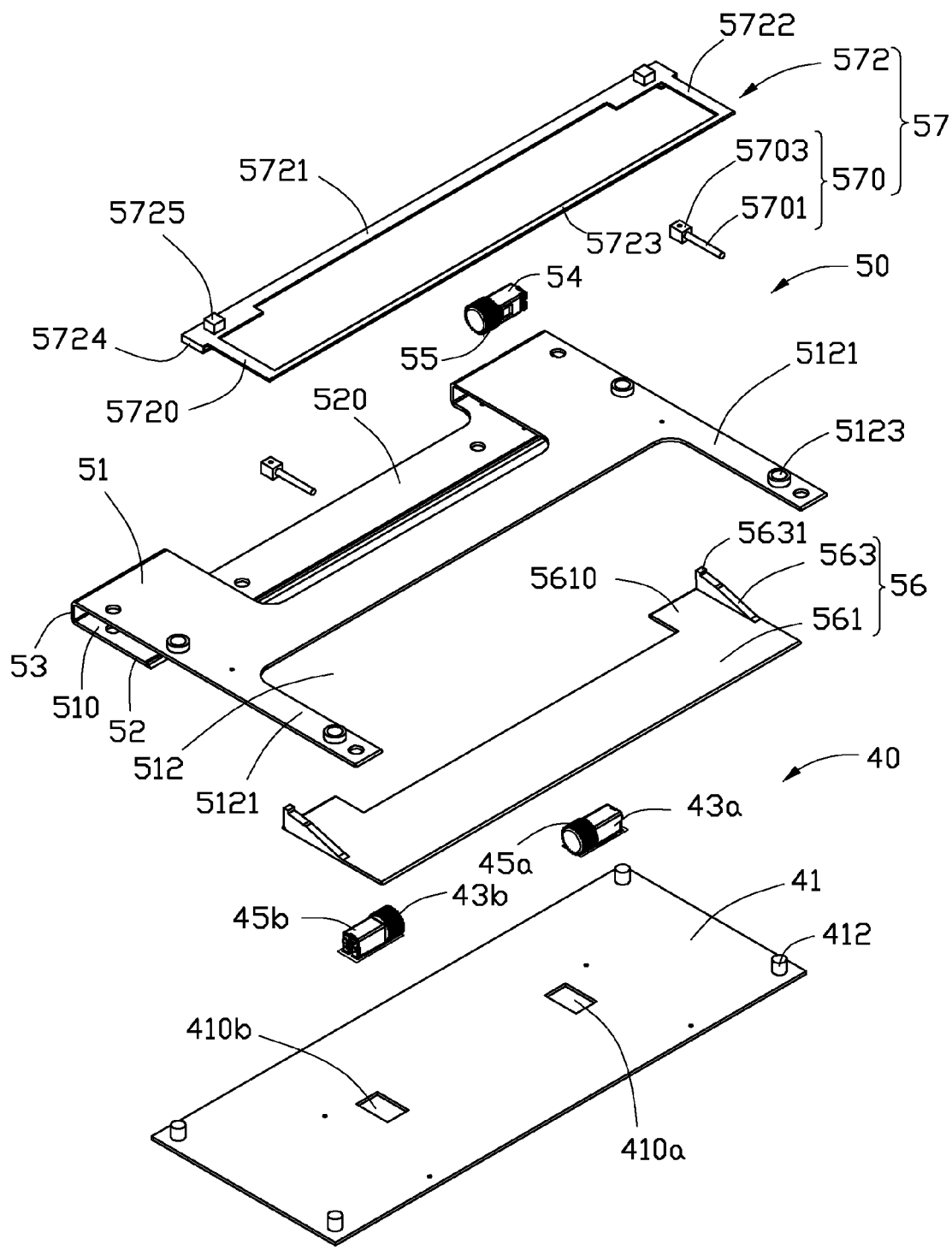
FIG. 8 is similar to FIG. 7, but viewing the electronic device from another angle.

Further referring to FIG. 7 and FIG. 8, the movable unit 40 includes a supporting board 41, two first motors 43a, 43b, and two first gears 45a, 45b mounted on a side of the supporting board 41 away from the second display 30. The second group guide rail members 20b are fixed on another side of the supporting board 41 facing the second display 30. The supporting board 41 includes two windows 410a, 410b. The two first gears 45a, 45b mesh with the two second elongated teethed portions 334 via the two windows 410a, 410b respectively. The two first motors 43a, 43b drive the two first gears 45a, 45b to rotate respectively, thereby driving the two second elongated teethed portions 334 to move. As a result, the second display 30 together with the second slidable portion 33 can be driven by the two first motors 43a, 43b to slide between the third position and the fourth position. The second slidable portion 33 can prevent the second screen 31 from vibrating when the second display 30 is sliding.

The driver unit 50 includes a first board 51, a second board 52, a third board 53, a second motor 54, a second gear 55 meshing with the first elongated teethed portion 112, a movable board 56, and a driver assembly 57 for driving the movable board 56 to move. The first board 51 is opposite to the second board 52. The third board 53 connects the first board 51 to the second board 52. When the second display 30 is in the third position, the second display 30 is partially received in a receiving space 510 cooperatively defined by the first board 51, the second board 52 and the third board 53 together. The first group guide rail members 20a are fixed on a side of the second board 52 facing the first display 10. The second motor 54 is fixed on an outer surface of the third board 53 and drives the second gear 55 to rotate, thereby driving the first elongated teethed portion 112 to move. As a result, the first display 10 together with the first slidable portion 13 can be driven by the second motor 54 to slide between the first position and the second position. The first slidable portion 13 can prevent the first screen 11 from vibrating when the first display 10 is sliding.

In order to reduce the weight of the driver unit 50, a hole 520 is cooperatively defined through the first board 51, the second board 52 and the third board 53 (see FIG. 7).

Figure 9:
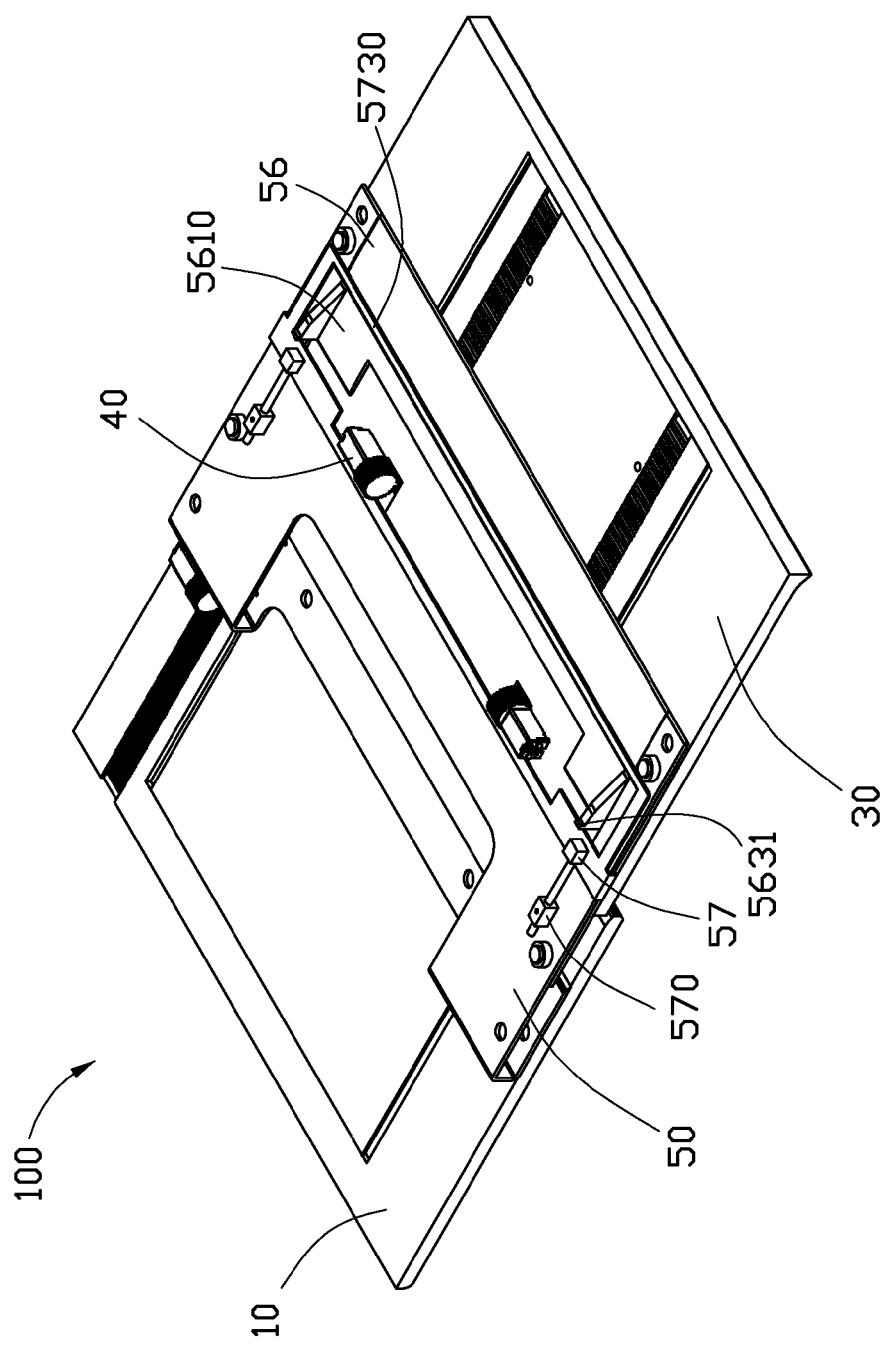
FIG. 9 is a partially isometric view of the electronic device of FIG. 4.
Figure 10:
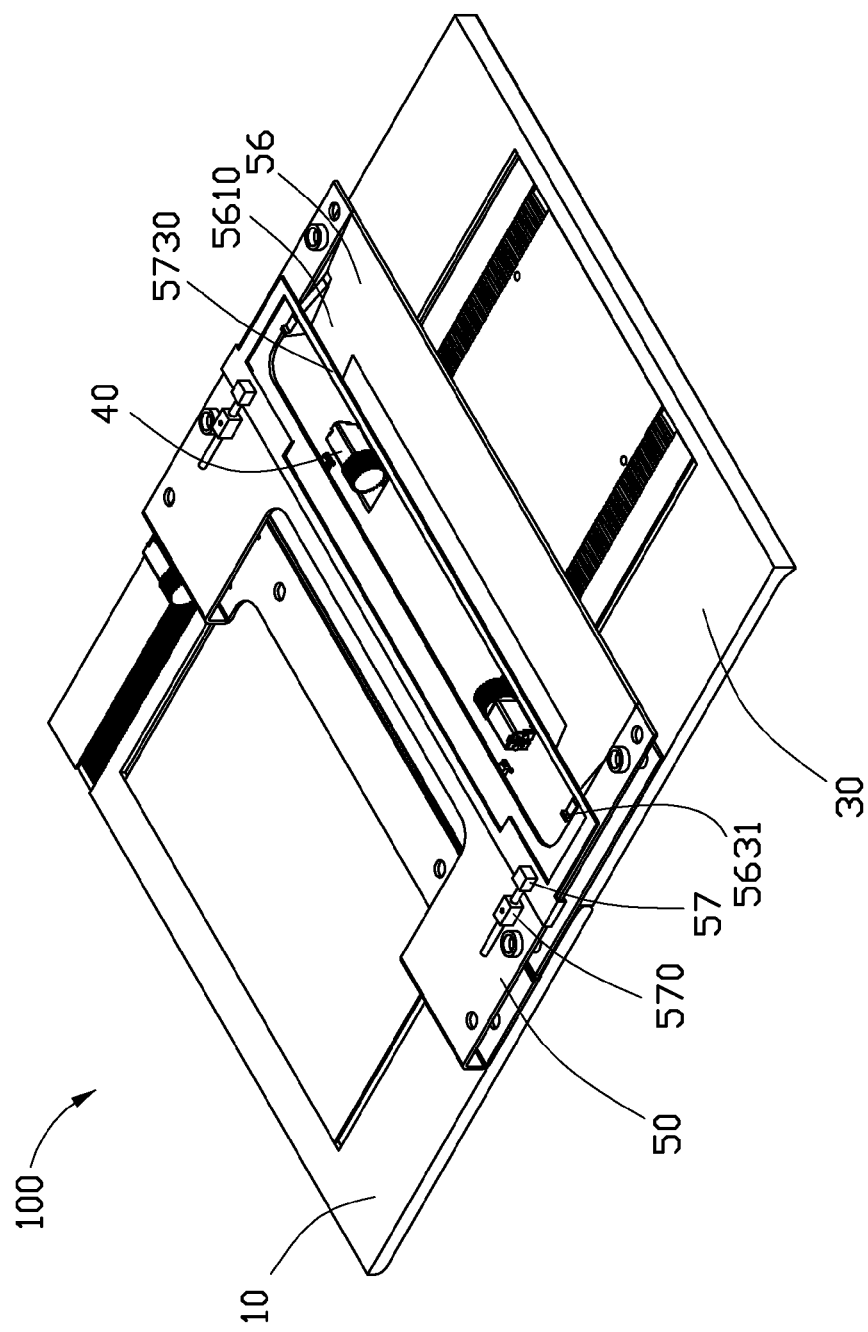
FIG. 10 is a partially isometric view of the electronic device of FIG. 5.

Further referring to FIG. 9 and FIG. 10, the movable board 56 is received in a receiving housing 512 defined through the first board 51. The receiving housing 512 includes two bars 5121 on opposite sides of the first board 51. The movable board 56 includes a body 561 and two opposite triangular blocks 563. One end of the body 561 is rotatably connected to the first board 51 and the other end of the body 561 forms a free end 5610. The triangular blocks 563 are fixed on a side of the free end 5610 away from the second display 30 and the height of triangular blocks 563 increases towards the third board 53. The free end 5610 supports the movable unit 40.

The driver assembly 57 includes two linear motors 570 and a moveable frame 572 corresponding to the receiving housing 512. Each linear motor 570 drives the moveable frame 572 to move along the sliding direction of the second display 30. Each linear motor 570 includes a moveable rod 5701 and a pusher 5703 to drive the moveable rod 5701 to move backwards or forwards. The moveable frame 572 includes a first side 5720, a second side 5721, a third side 5722, a fourth side 5723, two cases 5724 and two fixed blocks 5725. The first side 5720, the second side 5721, the third side 5722, the fourth side 5723 are perpendicular with end to end. The first side 5720 is parallel to the third side 5722. The second side 5721 is parallel to the fourth side 5723. The first side 5720 and the third side 5722 are perpendicular to the third board 53, and the second side 5721 is nearer to the third board 53 than the fourth side 5723. One pusher 5703 is fixed to the first side 5720 and the relative moveable rod 5701 is parallel to the first side 5720. The other pusher 5703 is fixed to the third board 53 and the relative moveable rod 5701 is parallel to the third board 53. Each case 5724 for receiving each bar 5121 is fixed on one end of the second side 5721. Each moveable rod 5701 is fixed to each fixed block 5725. Each fixed block 5725 is fixed on one end of the second side 5721. Each fixed block 5725 corresponds to each case 5724.

When the pusher 5703 of the linear motor 570 drives the moveable rod 5701 to pull the moveable frame 572 to move along the sliding direction of the second display 30, the first side 5720 and the third side 5722 of the moveable frame 572 drive the movable board 56 together with the second display 30 to move from the fourth position to the fifth position, along a direction perpendicular to the sliding direction of the second display 30. Two limiting rods 5631 are fixed on the free end 5610 to stop the fourth side 5723 from moving out of the free end 5160. The supporting board 41 of the movable unit 40 further includes four fixing rods 412 extending from the side of the supporting board 41 away from the second display 30. Four receiving holes 5123 are operable to receive the four fixing rods 412 moveably, defined on the bars 5121.

Figure 5:
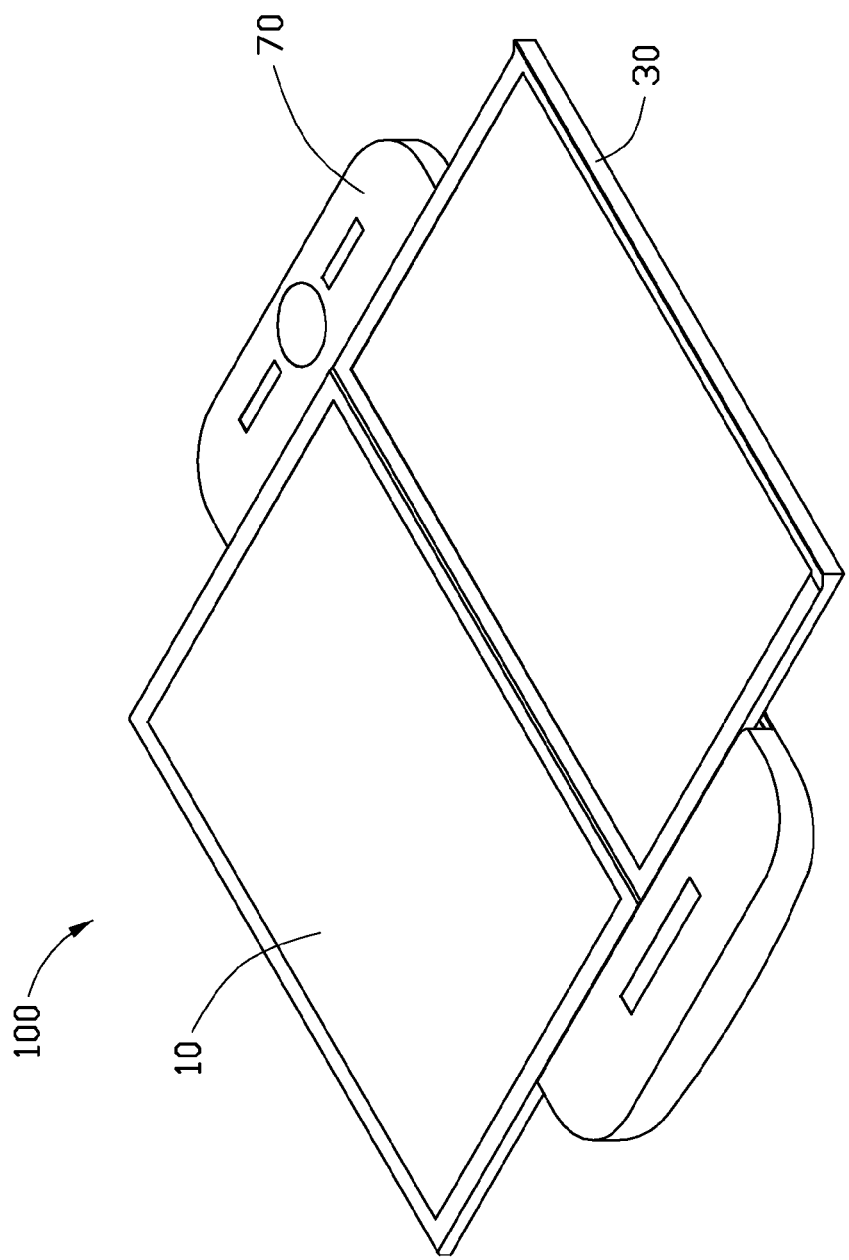
FIG. 5 is similar to FIG. 4, but showing the electronic device in a second state.

When the screen of the electronic device 100 shown in FIG. 1 is to be extended into the wide screen as shown in FIG. 5, the second motor 54 drives the second gear 55 to rotate and move along the first elongated teethed portion 112 of the first screen 11, thereby the first slidable portion 13 together with the first display 10 slides from the first position to the second position; the first motors 43a, 43b drive the first gears 45a, 45b to rotate and move along the second elongated teethed portions 334 of the second screen 31, thereby the second slidable portion 33 together with the second display 30 slides from the third position to the fourth position; the orthogonal projection of the first display 10 is next to that of the second display 30 (see FIG. 4); and then, the driver assembly 57 of the driver unit 50 drives the supporting board 41 of the movable unit 40 together with the second display 30 to move from the fourth position to the fifth position, along a direction perpendicular to the sliding direction of the second display 30. Thus, the first display 10 and the second display 30 are coplanar (see FIG. 5) to cooperatively display information.

When the dual screen configuration of the electronic device 100 shown in FIG. 5 is to be switched to the single screen shown in FIG. 1, the driver assembly 57 of the driver unit 50 drives the supporting board 41 of the movable unit 40 together with the second display 30 to move from the fifth position to the fourth position; then, the second motor 54 drives the second gear 55 to rotate and move along the first elongated teethed portion 112 of the first screen 11, thereby the first slidable portion 13 together with the first display 10 slides from the second position to the first position; and the two first motors 43a, 43b drive the two first gears 45a, 45b to rotate and move along the two second elongated teethed portions 334 of the second screen 31, thereby the second slidable portion 33 together with the second display 30 slides from the fourth position to the third position, then the first display 10 covers the second display 30, the first display 10 can be active and the second display 30 may be on a standby state or shut down. The electronic device 100 can be used in computers or other electronic devices.

It is to be understood, however, that even though numerous has been described with reference to particular embodiments, but the present invention is not limited to the particular embodiments described and exemplified, and the embodiments are capable of considerable variation and modification without departure from the scope of the appended claims.

What is claimed is:

1. An electronic device, comprising:
a first display comprising a first screen, a first slidable portion fixed on the first screen, a first body, and a first recess being set on the first body and extending along the sliding direction of the first display, the first recess being defined to receive the first slidable portion;

a second display;

a first group guide rail members configured for guiding the first slidable portion together with the first screen to move between a first position and a second position;

a second group guide rail members configured for guiding the second display to move between a third position and a fourth position;

a movable unit; and a driver unit configured for driving the movable unit to move the second display between the fourth position and a fifth position along a direction perpendicular to the sliding direction of the second display;

wherein when the first display is in the first position and the second display is in the third position, the first display covers the second display; when the first display is in the second position and the second display is in the fourth position, an orthogonal projection of the first display is next to an orthogonal projection of the second display; and when the first display is in the second position and the second display is in the fifth position, the first display and the second display are coplanar.

2. The electronic device of claim 1, wherein the first slidable portion comprises two opposite first slidable bars extending along the sliding direction of the first display; and the first group guide rail members comprises a plurality of guide rail members, each guide rail member comprising a slidable recess to receive and guide the first slidable bars.

3. The electronic device of claim 1, wherein the first screen further comprises a first elongated teethed portion fixed on the first body and extending along the sliding direction of the first display; and the driver unit comprises a first board, a second board opposite to the first board, a third board connecting the first board and the second board, a motor mounted on the third board, and a gear protruding from the second board to mesh with the first elongated teethed portion, the gear being driven by the motor to slide together with the first display between the first position and the second position.

4. The electronic device of claim 3, wherein when the second display is in the third position, and the second display is received in a receiving space cooperatively defined by the first board, the second board and the third board.

5. The electronic device of claim 3, wherein the driver unit further comprises a movable board received in a receiving housing defined through the first board, and a driver assembly for driving the movable board to eject out of the receiving housing, while the movable board moves together with the second display between the fourth position and the fifth position, along a direction perpendicular to the sliding direction of the second display.

6. The electronic device of claim 5, wherein the movable board comprises a body and two opposite triangular blocks, one end of the body rotatably connecting to the first board and the other end of the body forming a free end to support the movable unit, each triangular block being fixed on the side of the free end far away from the second display, the height of triangular block increasing towards the third board.

7. The electronic device of claim 6, wherein the driver assembly comprises two linear motors and a moveable frame relative to the receiving housing, the moveable frame being driven by the two linear motors to move along the sliding direction of the second display, the moveable frame comprising two opposite bars.

8. The electronic device of claim 7, wherein each linear motor comprises an extendable rod and a pusher fixed on the first board away from the second display, while the pusher pushing the extendable rod to move linearly along the sliding direction of the second display; and the moveable frame is composed by a first side, a second side, a third side and a fourth side perpendicular with end to end, the second side being nearer to the third board than the fourth side, two cases defined for receiving the two bars being fixed on the two ends of the second side, two fixed blocks for fixing the two extendable rods being fixed on the two ends of the second side.

9. The electronic device of claim 8, wherein two limiting rods are fixed on the free end to limit the third side to move on the free end.

10. The electronic device of claim 1, wherein the second display comprises a second screen and a second slidable portion fixed on the second screen, the second group guide rail members guiding the second slidable portion together with the second screen to slide between the third position and the fourth position.

11. The electronic device of claim 10, wherein the second screen comprises a second body and a second recess defined for receiving the second slidable portion, while the second recess is set on the second body and extends along the sliding direction of the second display.

12. The electronic device of claim 10, wherein the second slidable portion comprises two opposite second slidable bars extending along the sliding direction of the second display; and the second group guide rail members comprise a plurality of guide rail members, each guide rail member comprising a slidable recess to receive and guide one second slidable bar.

13. The electronic device of claim 10, wherein the second slidable portion comprises two second elongated teethed portions extending along the sliding direction of the second display; and the movable unit comprises a supporting board including four guide rail members, two motors mounted on the supporting board, and two first gears mounted on the side of the supporting board away from the second display and protruding out of the supporting board to mesh with the two second elongated teethed portions, while the each motor drives each gear to rotate and move along each second elongated teethed portion.

14. The electronic device of claim 13, wherein each first gear meshes with each second elongated teethed portion of the second slidable portion via each window defined through the supporting board.

15. The electronic device of claim 13, wherein four fixing rods extend from the side of the supporting board away from the second display; and four receiving holes are defined through the driver unit for moveably receiving the four fixing rods.

* * * * *